United States Patent
Tukaram Shinde et al.

(10) Patent No.: US 12,169,010 B2
(45) Date of Patent: Dec. 17, 2024

(54) ASSEMBLY OF TORSIONAL SPRING TYPE ROLLER JAMMER TORQUE LIMITER

(71) Applicant: Hamilton Sundstrand Corporation, Charlotte, NC (US)

(72) Inventors: Swapnil Tukaram Shinde, Maharashtra (IN); Ramesh Babu, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 490 days.

(21) Appl. No.: 17/530,283

(22) Filed: Nov. 18, 2021

(65) Prior Publication Data
US 2023/0101756 A1  Mar. 30, 2023

(30) Foreign Application Priority Data
Sep. 25, 2021 (IN) .............. 202111043549

(51) Int. Cl.
*F16D 67/00* (2006.01)
*B64C 13/34* (2006.01)
(Continued)

(52) U.S. Cl.
CPC .............. *F16D 67/00* (2013.01); *B64C 13/34* (2013.01); *F16D 3/10* (2013.01); *F16D 3/72* (2013.01);
(Continued)

(58) Field of Classification Search
CPC . F16D 3/10; F16D 43/02; F16D 43/20; F16D 43/208; F16D 59/00; F16D 67/00;
(Continued)

(56) References Cited

U.S. PATENT DOCUMENTS

| | | | |
|---|---|---|---|
| 3,640,092 A | * | 2/1972 | Neal ..................... F16D 43/208 192/17 R |
| 8,127,912 B2 | | 3/2012 | Lang et al. |

(Continued)

FOREIGN PATENT DOCUMENTS

| | | |
|---|---|---|
| EP | 3222869 A1 | 9/2017 |
| EP | 3699448 A1 | 8/2020 |
| EP | 3783241 A1 | 2/2021 |

OTHER PUBLICATIONS

Search Report issued in European Patent Application No. 22197837.2; Application Filing Date Sep. 26, 2022; Date of Mailing Feb. 21, 2023 (7 pages).

*Primary Examiner* — Richard M Lorence
(74) *Attorney, Agent, or Firm* — CANTOR COLBURN LLP

(57) ABSTRACT

A torque limiter (TL) is provided for torque transmission (TT) to downstream components. The TL includes an input shaft, an output shaft and a torsional spring which is preloadable by a preload torque whereupon the torsional spring is fittable about the output shaft with the output shaft fit about the input shaft. For input shaft rotation, first TT paths proceed from the input shaft to the output shaft through the torsional spring when downstream torque of the downstream components deceeds the preload torque and a second TT path proceeds from the input shaft to an external structure when the downstream torque exceeds the preload torque.

20 Claims, 5 Drawing Sheets

(51) Int. Cl.
    *F16D 3/10*     (2006.01)
    *F16D 3/72*     (2006.01)
    *F16D 41/067*     (2006.01)
    *F16D 43/02*     (2006.01)
    *F16D 43/20*     (2006.01)
    *F16D 59/00*     (2006.01)
    *F16D 121/14*     (2012.01)

(52) U.S. Cl.
    CPC ............ *F16D 41/067* (2013.01); *F16D 43/02* (2013.01); *F16D 43/20* (2013.01); *F16D 59/00* (2013.01); *F16D 2121/14* (2013.01)

(58) Field of Classification Search
    CPC ...... F16D 3/72; F16D 41/067; F16D 2121/14; B62C 13/28; B62C 13/34
    USPC ....................................................... 192/223.2
    See application file for complete search history.

(56) References Cited

U.S. PATENT DOCUMENTS

| | | |
|---|---|---|
| 10,570,963 B2 | 2/2020 | Davies |
| 10,900,526 B2 | 1/2021 | Davies |
| 10,900,528 B2 | 1/2021 | Gianfranceschi |
| 2006/0163026 A1 | 7/2006 | Lang |
| 2021/0018045 A1 | 1/2021 | Kracke |

\* cited by examiner

(12) United States Patent US 12,169,010 B2

ASSEMBLY OF TORSIONAL SPRING TYPE ROLLER JAMMER TORQUE LIMITER

CROSS-REFERENCE TO RELATED APPLICATIONS

This application claims the benefit of Indian Application No. 202111043549 filed Sep. 25, 2021, the disclosure of which is incorporated herein by reference in its entirety.

BACKGROUND

The present disclosure relates to torque limiters and, more particularly, to an assembly of a torsional spring type roller jammer torque limiter.

Torque limiters can be used in any power drive system to protect components from torsional overload. In general, a torque limiter (TL) of secondary flight control actuation systems (such as high-lift actuation systems) provides torque transmission (TT) to downstream actuators and a gear assembly. At the same time, the TL protects the transmission system from which the torque originates in case of a jam in the downstream actuators or the gear assembly. The TL typically does this by diverting a TT path to an earth structure.

A challenge in TL assemblies is to interconnect an input shaft, a spring and an output shaft in limited space without losing the functional requirements of the TL in both clockwise and counter-clockwise rotations of the input shaft without any significant additional assembly operations or adjustments.

BRIEF DESCRIPTION

According to an aspect of the disclosure, a torque limiter (TL) is provided for torque transmission (TT) to downstream components. The TL includes an input shaft, an output shaft and a torsional spring which is preloadable by a preload torque whereupon the torsional spring is finable about the output shaft with the output shaft fit about the input shaft. For input shaft rotation, first TT paths proceed from the input shaft to the output shaft through the torsional spring when downstream torque of the downstream components deceeds the preload torque and a second TT path proceeds from the input shaft to an external structure when the downstream torque exceeds the preload torque.

In accordance with additional or alternative embodiments, for clockwise and counter-clockwise input shaft rotation, normal operations are characterized in that the downstream torque deceeds the preload torque, and, for clockwise and counter-clockwise input shaft rotation, a jammed condition is characterized in that the downstream torque exceeds the preload torque.

In accordance with additional or alternative embodiments, a first one of the first TT paths which is associated with clockwise input shaft rotation proceeds through the torsional spring in a first direction and a second one of the first TT paths which is associated with counter-clockwise input shaft rotation proceeds through the torsional spring in a second direction.

In accordance with additional or alternative embodiments, the TL further includes a roller jammer by which torque following the second TT path proceeds to the external structure.

In accordance with additional or alternative embodiments, the input shaft includes a cam profile.

In accordance with additional or alternative embodiments, the output shaft includes a gear which is communicative with the downstream components.

In accordance with additional or alternative embodiments, a preload angle of the torsional spring is based on a torque requirement at the output shaft.

According to an aspect of the disclosure, a torque limiter (TL) is provided for torque transmission (TT) to downstream components. The TL includes an input shaft including reaction faces, an output shaft defining slots and a torsional spring including first tangs and second tangs at opposite output shaft ends, respectively. The torsional spring is preloadable by a preload torque to align the first tangs and the second tangs whereupon, with the torsional spring fit about the output shaft and the output shaft fit about the input shaft, the first and second tangs are slidable into the slots and against the reaction faces. For input shaft rotation, first TT paths proceed from the input shaft to the output shaft through the torsional spring when downstream torque of the downstream components deceeds the preload torque and a second TT path proceeds from the input shaft to an external structure when the downstream torque exceeds the preload torque.

In accordance with additional or alternative embodiments, for clockwise and counter-clockwise input shaft rotation, normal operations are characterized in that the downstream torque deceeds the preload torque and, for clockwise and counter-clockwise input shaft rotation, a jammed condition is characterized in that the downstream torque exceeds the preload torque.

In accordance with additional or alternative embodiments, a first one of the first TT paths which is associated with clockwise input shaft rotation proceeds through the torsional spring in a first direction and a second one of the first TT paths which is associated with counter-clockwise input shaft rotation proceeds through the torsional spring in a second direction.

In accordance with additional or alternative embodiments, the TL further includes a roller jammer by which torque following the second TT path proceeds to the external structure.

In accordance with additional or alternative embodiments, the input shaft includes a cam profile.

In accordance with additional or alternative embodiments, the reaction faces face in opposite directions and are alignable with sides of the slots.

In accordance with additional or alternative embodiments, the output shaft includes a gear which is communicative with the downstream components.

In accordance with additional or alternative embodiments, the first tangs are at a first end of the output shaft and oppose one another by 180° and the second tangs are at a second end of the output shaft opposite the first end and oppose one another by 180°.

In accordance with additional or alternative embodiments, a preload angle of the torsional spring is based on a torque requirement at the output shaft.

According to an aspect of the disclosure, a method of assembling a torque limiter (TL) is provided. The method includes aligning first tangs of a torsional spring with slots of an output shaft, partially sliding the torsional spring onto the output shaft until the first tangs contact faces of the slots, preloading the torsional spring such that second tangs of the torsional springs align with the slots of the output shaft, fully sliding the torsional spring onto the output shaft until the second tangs contact faces of the slots, providing a secondary alignment of the first tangs and the second tangs with reaction faces of an input shaft and sliding the output shaft and the torsional spring onto the input shaft while maintaining the secondary alignment such that the first tangs and the second tangs impinge against the reaction faces.

In accordance with additional or alternative embodiments, the method further includes forming the torsional spring to exhibit a preload angle based on a torque requirement at the output shaft.

In accordance with additional or alternative embodiments, a method of arranging an actuation system is provided and includes assembling a TL, operably connecting a power drive unit (PDU) and a gear stage to the input shaft and the output shaft, respectively, and coupling a roller jammer connected with a housing structure to the input shaft.

In accordance with additional or alternative embodiments, the method further includes operating the actuation system, wherein, for clockwise and counter-clockwise input shaft rotation, normal operations are characterized in that downstream torque of the gear stage deceeds a preload torque of the torsional spring and torque applied to the input shaft by the PDU is transmitted to the gear stage, and, for clockwise and counter-clockwise input shaft rotation, a jammed condition is characterized in that the downstream torque exceeds the preload torque and the torque applied to the input shaft by the PDU is transmitted to the housing structure by the roller jammer.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In High-lift actuation systems rotary geared actuators (RGAs) are used for controlling movements of panels or control surfaces (both FLAP and SLAT). The RGA is a pure torque device intended to 'plug in' to a pinion located on the aircraft which then drives a rack to which the corresponding panel or control surface is attached. An RGA typically includes a torque limiter (TL) stage and a power stage or a gear stage. The TL stage provides a through-drive by an input shaft to allow torque to be transmitted to downstream actuators and the gear stage. The TL stage also provides a torque limiting function which protects the transmission system in the case of a jam and provides a divert path from the torque limiter to a mounting structure. The gear stage provides for speed reduction and torque amplification to drive the corresponding panel or control surface as well as a main interface to ground driving torques and feedback loads.

As will be described below, a TL is provided to interconnect an input shaft, a spring and an output shaft in limited space without losing the functional requirements of the TL in both clockwise and counter-clockwise rotations of the input shaft. When a jam occurs, such as when a torque requirement from the gear stage exceeds a preload torque (Ti) of the spring, the TL diverts the torque transmission (TT) path to an aircraft housing structure irrespective of a direction of rotation of input shaft. The TL can be assembled without significant additional assembly operations or adjustments.

The TL includes an input shaft and an output shaft that enable concentric assembly of components in a limited space. A torsional spring will be preloaded to a required torque value and assembled in slots of the output shaft. The preloaded torsional spring and the output shaft are aligned to torque reaction features of the input shaft and connected together. In this arrangement, the torsional spring serves as a connecting link between the input Shaft and the output shaft. This ensures that there is a TT path of input shaft-torsional spring-output shaft-gear stage when a torque requirement from the gear stage is less than the preload torque of the torsional spring and a TT path of input shaft-rollers-housing structure when the torque requirement from the gear stage exceeds the preload torque of the torsional spring.

Figure 1:
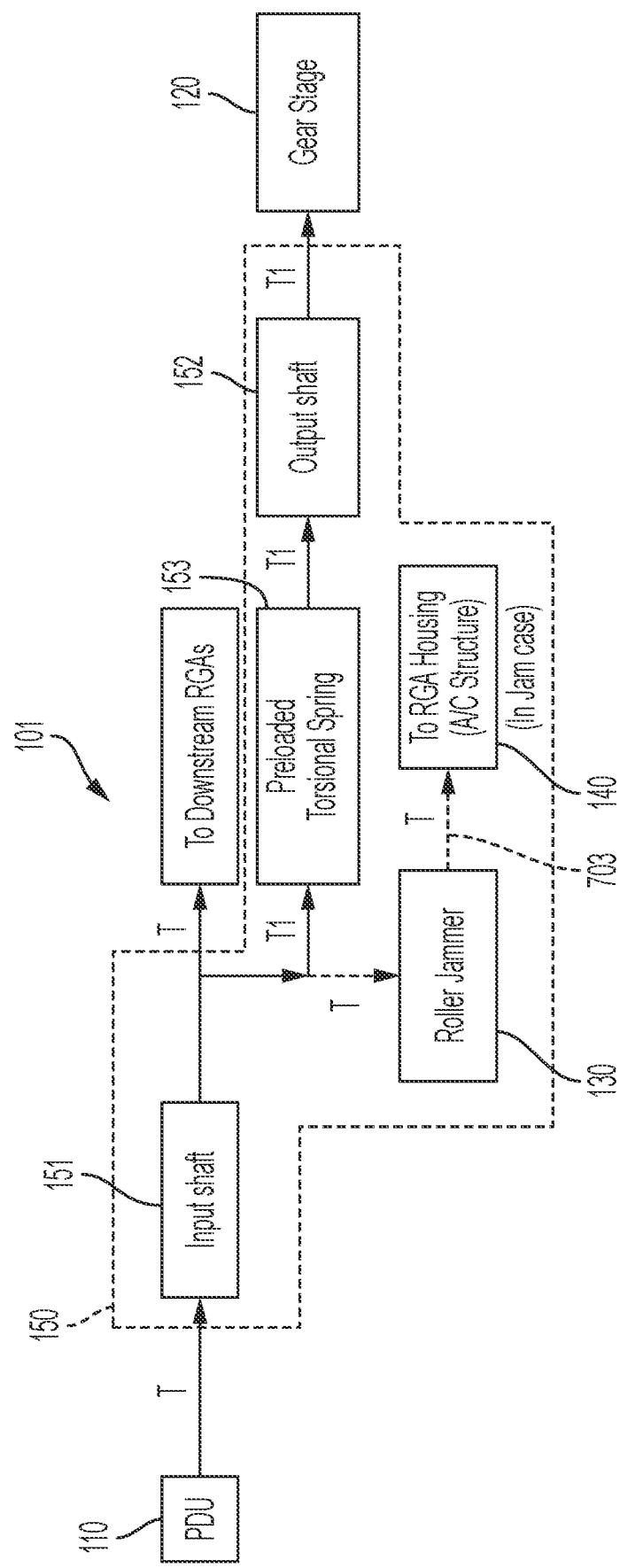
FIG. 1 is a schematic diagram of an actuation system in accordance with embodiments.
Figure 4:
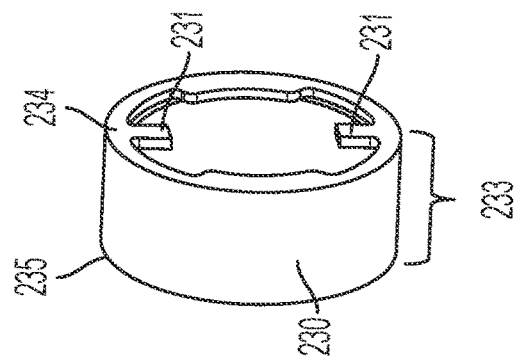
FIG. 4 is a perspective view of a torsional spring of a torque limiter in accordance with embodiments.
Figure 3:
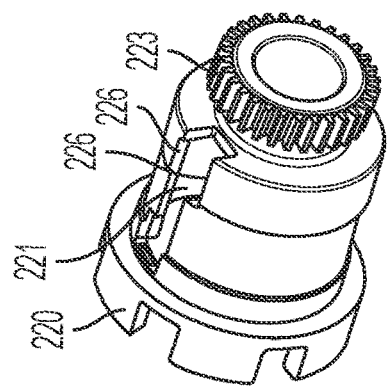
FIG. 3 is a perspective view of an output shaft of a torque limiter in accordance with embodiments.
Figure 2:
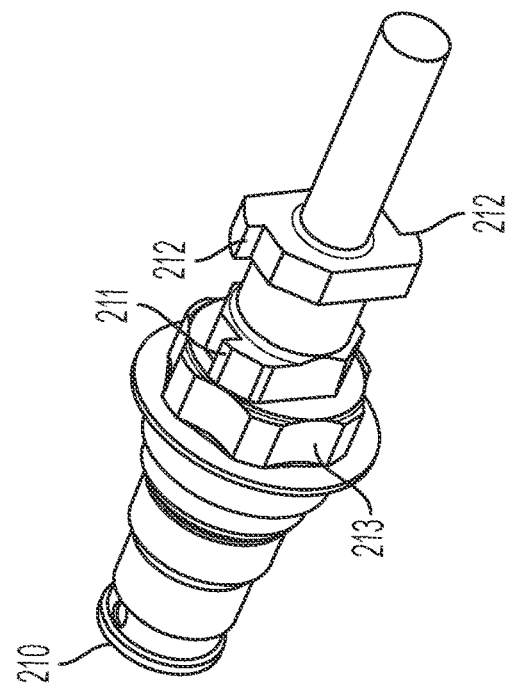
FIG. 2 is a perspective view of an input shaft of a torque limiter in accordance with embodiments.

With reference to FIG. 1, an actuation system 101 is provided and can be configured as a high-lift actuation system of an aircraft. In any case, the actuation system 101 includes a power drive unit (PDU) 110, a gear stage 120, a roller jammer 130, a housing structure 140 and a TL 150. The TL 150 includes an input shaft 151, and output shaft 152 and a torsional spring 153, which is preloaded by a preload torque. The TL 150 is provided with transmitting torque applied to the input shaft 151 by the PDU 110 from the input shaft 151, through the torsional spring 153 and to the output shaft 152 whereby the output shaft 152 can further transmit the torque to the gear stage 120 in certain cases. That is, for cases in which a downstream torque applied by the gear stage 120 is less than or deceeds the preload torque of the torsional spring 153, there will be no relative rotation between the input shaft 151 and the output shaft 152. Here, the torque applied to the input shaft 151 by the PDU 110 will proceed from the input shaft 151 rotating in clockwise or counter-clockwise directions, through the torsional spring 153 and to the output shaft 152 whereby the output shaft 152 can further transmit the torque to the gear stage 120. Conversely, for cases in which the downstream torque applied by the gear stage 120 exceeds the preload torque of the torsional spring 153, there will be relative rotation between the input shaft 151 and the output shaft 152. Here, the torque applied to the input shaft 151 by the PDU 110 will proceed from the input shaft 151 rotating in clockwise or counter-clockwise directions to the roller jammer 130 and from the roller jammer 130 to the housing structure 140.

With reference to FIGS. 2-6, a TL 201 (see FIG. 5), such as the TL 150 of FIG. 1, is provided for TT to downstream components, such as the gear stage 120 of FIG. 1. The TL 201 includes an input shaft 210 including first reaction faces 211, second reaction faces 212 and a cam profile 213, which is configured to be engaged by the roller jammer 130 of FIG. 1, an output shaft 220 that is formed to define a first slot 221 and a second slot 222 (see FIG. 5) and that includes a gear 223 which engages with downstream components (i.e., the gear stage 120 of FIG. 1) and a torsional spring 230. The torsional spring 230 includes first tangs 231, second tangs 232 (see FIG. 6) and a torsional spring section 233. The first tangs 231 are provided at a first end 234 of the torsional spring 230, the second tangs 232 are provided at a second end 235 of the torsional spring 230, which is opposite the first end 234, and the torsional spring section 233 is axially interposed between the first end 234 and the second end 235. The first reaction faces 211 face in opposite directions from one another and oppose one another at opposite sides of the input shaft 210 by 180°. The second reaction faces 212 face in opposite directions from one another and oppose one another at opposite sides of the input shaft 210 by 180°. The first slot 221 and the second slot 222 oppose one another at opposite sides of the output shaft 220 by 180°. The first slot 221 and the second slot 222 each include slot faces 226. The first tangs 231 are provided at opposite sides of the first end 234 and oppose one another by 180°. The second tangs 232 are provided at opposite sides of the second end 235 and oppose one another by 180°.

Figure 6:
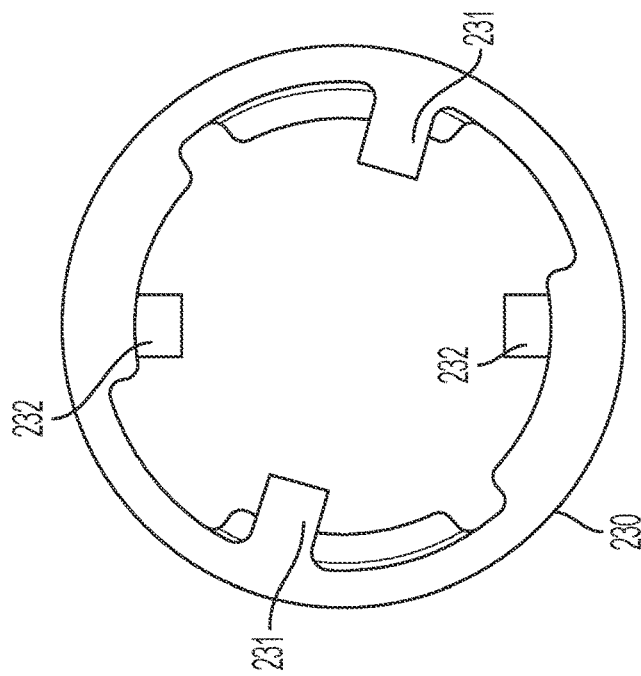
FIG. 6 is an axial view illustrating a preload angle of the torsional spring of FIG. 4 in accordance with embodiments.
Figure 5:
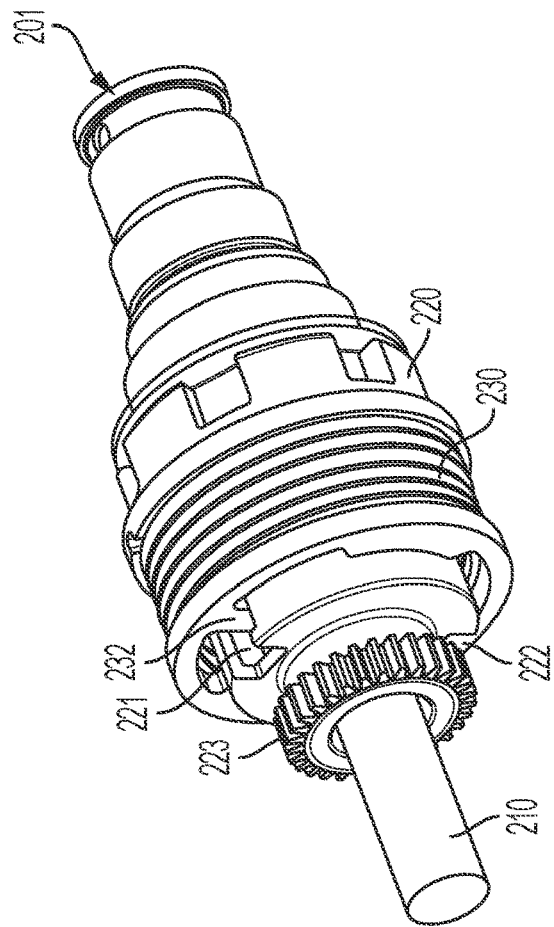
FIG. 5 is a perspective view of the input shaft, the output shaft and the torsional spring of FIGS. 2-4 assembled together to form a torque limiter in accordance with embodiments.

As shown in FIG. 6, at an initial time before the torsional spring 230 is preloaded, the first tangs 231 and the second tangs 232 are offset from one another by a preload angle. In accordance with embodiments, the preload angle is defined based on a torque requirement of downstream components (i.e., the gear stage 120 of FIG. 1) at the output shaft 220.

With the construction described above, the torsional spring 230 is preloadable by the preload torque on the output shaft 220 to align the first tangs 231 and the second tangs 232 with one another. Once this alignment is achieved, with the torsional spring 230 fit about the output shaft 220 and with the output shaft 220 fit about the input shaft 210, corresponding ones of the first tangs 231 and the second tangs 232 are slidable into the first slot 221 of the output shaft 220 and into abutment against corresponding ones of the first reaction faces 211 and the second reaction faces 212 and a side of the first slot 221 while the other corresponding ones of the first tangs 231 and the second tangs 232 are slidable into the second slot 222 of the output shaft 220 and into abutment against corresponding ones of the first reaction faces 211 and the second reaction faces 212 and a side of the second slot 222.

Figure 7:
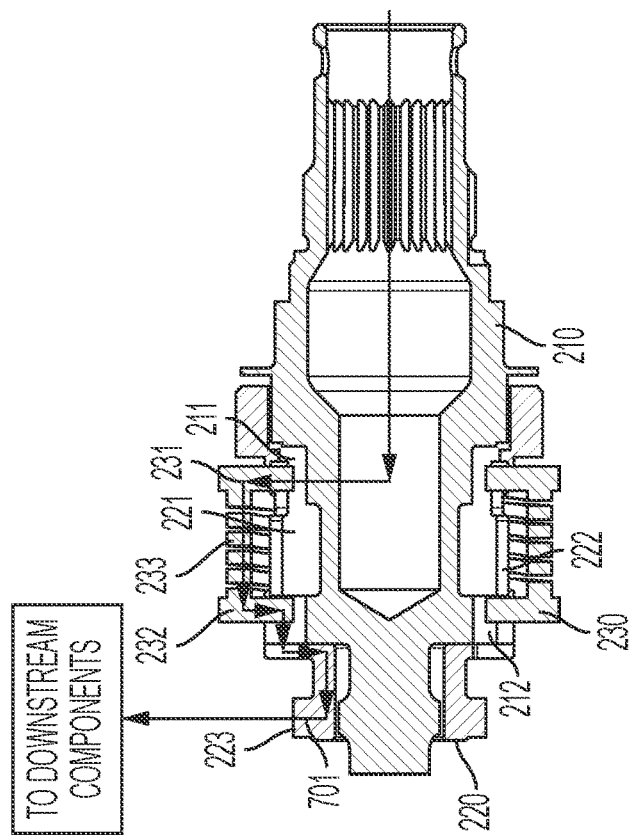
FIG. 7 is a side view illustrating a torque transmission path through the torque limiter of FIG. 5 in an operational setting in accordance with embodiments.
Figure 8:
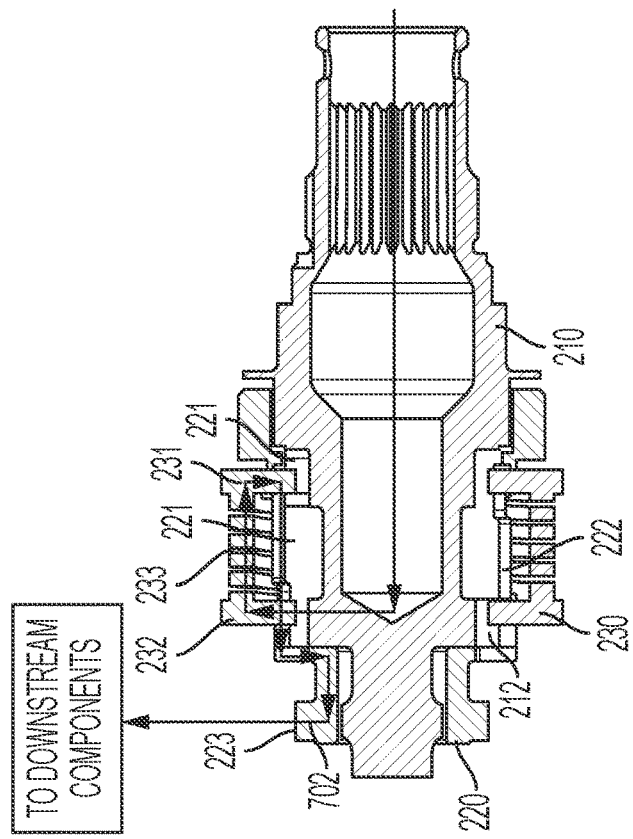
FIG. 8 is a side view illustrating a torque transmission path through the torque limiter of FIG. 5 in an operational setting in accordance with embodiments.

Thus, with reference to FIGS. 7 and 8, for clockwise and counter-clockwise rotations of the input shaft 210, first TT paths 701 (see FIG. 1) and 702 (see FIG. 2) proceed from the input shaft 210 to the output shaft 220 through the torsional spring 230 when the downstream torque of the downstream components (i.e., the gear stage 120 of FIG. 1) deceeds the preload torque. These are considered normal operations of the TL 201. More particularly, for clockwise rotations of the input shaft 210, when the downstream torque of the downstream components (i.e., the gear stage 120 of FIG. 1) deceeds the preload torque of the torsional spring 230, torque transmission proceeds from the input shaft 210 to the output shaft 220 and through the torsional spring 230 in a first direction from the first end 234 to the second end 235. Conversely, for counter-clockwise rotations of the input shaft 210, when the downstream torque of the downstream components (i.e., the gear stage 120 of FIG. 1) deceeds the preload torque of the torsional spring 230, torque transmission proceeds from the input shaft 210 to the output shaft 220 and in a loop through the torsional spring 230 in a second direction from the second end 235 to the first end 234.

When the downstream torque of the downstream components (i.e., the gear stage 120 of FIG. 1) exceeds the preload torque of the torsional spring 230 or the output shaft 220 stops rotating, a jam condition occurs. In these cases, the first tangs 231 and the second tangs 232 will twist relative to each other and there will be relative rotation of the input shaft 210 and the output shaft 220. When this occurs, the roller jammer 130 of FIG. 1 will engage the input shaft 210 and divert torque to the housing structure 140 along a second TT path 703 (see FIG. 1).

Figure 9:
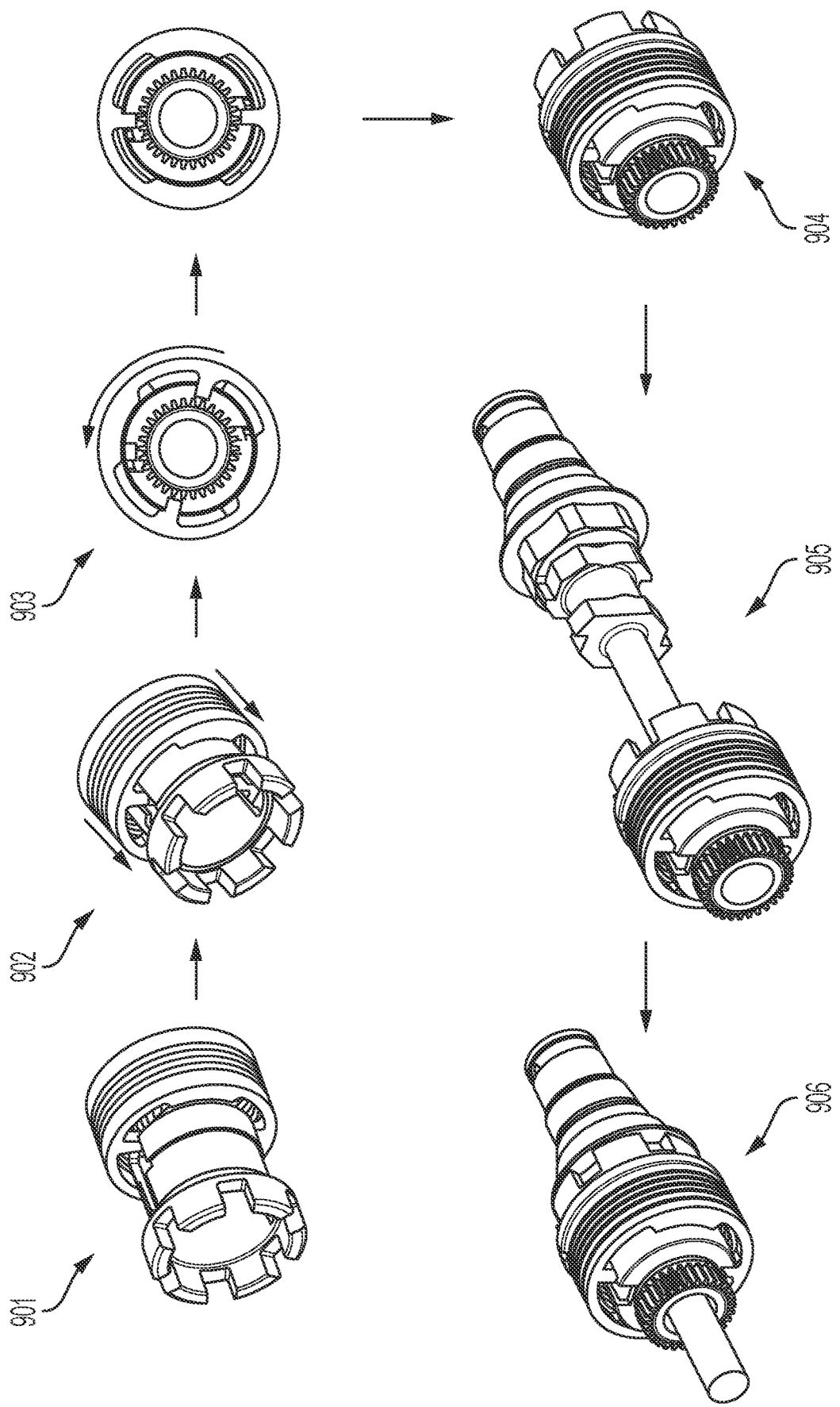
FIG. 9 is an illustrative diagram showing a method of assembling a torque limiter in accordance with embodiments.

With reference to FIG. 9, a method of assembling a TL, such as the TL 150 and the TL 201 described above, is provided. As shown in FIG. 9, the method includes aligning first tangs of a torsional spring with slots of an output shaft (901), partially sliding the torsional spring onto the output shaft until the first tangs contact faces of the slots (902), preloading the torsional spring, which is formed to be preloaded by an amount based on a torque requirement of the output shaft, such that second tangs of the torsional springs align with the slots of the output shaft (903), fully sliding the torsional spring onto the output shaft until the second tangs contact faces of the slots (904), providing a secondary alignment of the first tangs and the second tangs with reaction faces of an input shaft (905) and sliding the output shaft and the torsional spring onto the input shaft while maintaining the secondary alignment such that the first tangs and the second tangs impinge against the reaction faces (906).

With continued reference to FIG. 9 and with reference back to FIG. 1, a method of arranging an actuation system, such as a high-lift actuation system of an aircraft, is provided. The method includes assembling a TL according to the method of FIG. 9, operably connecting a PDU 110 and a gear stage 120 to the input shaft 151 and the output shaft 152, respectively, and coupling a roller jammer 130 connected with a housing structure 140 to the input shaft 151. The method further includes operating the actuation system.

Technical effects and benefits of the present disclosure are the provision of a torque limiter (TL) with very few numbers of parts (i.e., a weight and cost benefit), no additional components required for spring retention, a simple and fool-proof assembly process (facilitates possibly automated assembly) and no additional adjustments (shimming) required during assembly due to the high accuracy of the torsional spring. The TL also ensures all functional requirements of the TL are met.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A torque limiter (TL) for torque transmission (TT) to downstream components, comprising:
   an input shaft comprising reaction faces;
   an output shaft defining slots; and
   a torsional spring comprising first and second tangs initially offset from one another, the torsional spring being preloadable by a preload torque to align the first and second tangs whereupon the torsional spring is fittable about the output shaft with the output shaft fit about the input shaft and with the first and second tangs respectively engaging with the slots and the reaction faces, and,
   for input shaft rotation:
   first TT paths proceed from the input shaft to the output shaft through the torsional spring when downstream torque of the downstream components deceeds the preload torque, and
   a second TT path proceeds from the input shaft to an external structure when the downstream torque exceeds the preload torque.

2. The TL according to claim 1, wherein:
   for clockwise and counter-clockwise input shaft rotation, normal operations are characterized in that the downstream torque deceeds the preload torque, and
   for clockwise and counter-clockwise input shaft rotation, a jammed condition is characterized in that the downstream torque exceeds the preload torque.

3. The TL according to claim 1, wherein:
   a first one of the first TT paths which is associated with clockwise input shaft rotation proceeds through the torsional spring in a first direction, and
   a second one of the first TT paths which is associated with counter-clockwise input shaft rotation proceeds through the torsional spring in a second direction.

4. The TL according to claim 1, further comprising a roller jammer by which torque following the second TT path proceeds to the external structure.

5. The TL according to claim 1, wherein the input shaft comprises a cam profile.

6. The TL according to claim 1, wherein the output shaft comprises a gear which is communicative with the downstream components.

7. The TL according to claim 1, wherein a preload angle of the torsional spring is based on a torque requirement at the output shaft.

8. A torque limiter (TL) for torque transmission (TT) to downstream components, comprising:
   an input shaft comprising reaction faces;
   an output shaft defining slots; and
   a torsional spring comprising first tangs and second tangs at opposite output shaft ends, respectively,
   the torsional spring being preloadable by a preload torque to align the first tangs and the second tangs whereupon, with the torsional spring fit about the output shaft and the output shaft fit about the input shaft, the first and second tangs are slidable into the slots and against the reaction faces, and,
   for input shaft rotation:
   first TT paths proceed from the input shaft to the output shaft through the torsional spring when downstream torque of the downstream components deceeds the preload torque, and
   a second TT path proceeds from the input shaft to an external structure when the downstream torque exceeds the preload torque.

9. The TL according to claim 8, wherein:
   for clockwise and counter-clockwise input shaft rotation, normal operations are characterized in that the downstream torque deceeds the preload torque, and
   for clockwise and counter-clockwise input shaft rotation, a jammed condition is characterized in that the downstream torque exceeds the preload torque.

10. The TL according to claim 8, wherein:
    a first one of the first TT paths which is associated with clockwise input shaft rotation proceeds through the torsional spring in a first direction, and
    a second one of the first TT paths which is associated with counter-clockwise input shaft rotation proceeds through the torsional spring in a second direction.

11. The TL according to claim 8, further comprising a roller jammer by which torque following the second TT path proceeds to the external structure.

12. The TL according to claim 8, wherein the input shaft comprises a cam profile.

13. The TL according to claim 8, wherein the reaction faces face in opposite directions and are alignable with sides of the slots.

14. The TL according to claim 8, wherein the output shaft comprises a gear which is communicative with the downstream components.

15. The TL according to claim 8, wherein:
    the first tangs are at a first end of the output shaft and oppose one another by 180°, and
    the second tangs are at a second end of the output shaft opposite the first end and oppose one another by 180°.

16. The TL according to claim 8, wherein a preload angle of the torsional spring is based on a torque requirement at the output shaft.

17. A method of assembling a torque limiter (TL), the method comprising:
    aligning first tangs of a torsional spring with slots of an output shaft;
    partially sliding the torsional spring onto the output shaft until the first tangs contact faces of the slots;
    preloading the torsional spring such that second tangs of the torsional springs align with the slots of the output shaft;
    fully sliding the torsional spring onto the output shaft until the second tangs contact faces of the slots;
    providing a secondary alignment of the first tangs and the second tangs with reaction faces of an input shaft; and
    sliding the output shaft and the torsional spring onto the input shaft while maintaining the secondary alignment such that the first tangs and the second tangs impinge against the reaction faces.

18. The method according to claim 17, further comprising forming the torsional spring to exhibit a preload angle based on a torque requirement at the output shaft.

19. A method of arranging an actuation system, comprising:
    assembling a TL according to the method of claim 17;

operably connecting a power drive unit (PDU) and a gear stage to the input shaft and the output shaft, respectively; and coupling a roller jammer connected with a housing structure to the input shaft.

20. The method of arranging the actuation system according to claim 19, further comprising operating the actuation system, wherein:

for clockwise and counter-clockwise input shaft rotation, normal operations are characterized in that downstream torque of the gear stage deceeds a preload torque of the torsional spring and torque applied to the input shaft by the PDU is transmitted to the gear stage, and for clockwise and counter-clockwise input shaft rotation, a jammed condition is characterized in that the downstream torque exceeds the preload torque and the torque applied to the input shaft by the PDU is transmitted to the housing structure by the roller jammer.

* * * * *